United States Patent [19]

Yamada

[11] 4,386,267
[45] May 31, 1983

[54] COLOR ISOLATION METHOD

[75] Inventor: Mitsuhiko Yamada, Kyoto, Japan

[73] Assignee: Dainippon Screen Seizo Kabushiki Kaisha, Kyoto, Japan

[21] Appl. No.: 197,030

[22] Filed: Oct. 15, 1980

[30] Foreign Application Priority Data

Oct. 22, 1979 [JP] Japan .................................. 55-135194

[51] Int. Cl.³ .............................................. G01J 3/34
[52] U.S. Cl. ..................................... 250/226; 356/405
[58] Field of Search ................ 250/226; 356/402, 403, 356/404, 405, 406, 407, 408

[56] References Cited

U.S. PATENT DOCUMENTS 3,560,758 2/1971 Swanberg ........................... 250/226
3,814,932 6/1974 Anati et al. ......................... 356/405
3,874,799 4/1975 Isaacs et al. ......................... 356/405
4,289,405 9/1981 Tobias ................................ 250/226

Primary Examiner—David C. Nelms
Attorney, Agent, or Firm—Lackenbach, Siegel, Marzullo, Presta & Aronson

[57] ABSTRACT

The method allows the isolation of a certain portion of an original color picture having a color which corresponds to a reference color in a photoelectrical picture reproducing process. The colors of the original picture as well as the reference color are identified by using a color plane which is divided up into incremental areas. Since the computation process is simplified, the color isolation process can be accomplished at the same time as the original picture is photoelectrically scanned.

10 Claims, 5 Drawing Figures

COLOR ISOLATION METHOD

BACKGROUND OF THE INVENTION

1. Field of the Invention

This invention relates to a color isolation method, for a picture reproducing machine such as a color scanner for making printing plates, wherein portions of an original picture corresponding to a certain specific color is selectively isolated and in particular to a method wherein a specific color is given in advance and portions of an original picture having a color corresponding to the given color are isolated simultaneously as the original picture is scanned. Such a process is useful for compensating or totally changing a certain selected color of an original picture without changing the colors of the remaining part of the original picture.

2. Description of the Prior Art

According to a conventional method, such a process is accomplished by comparing the ratios between three basic colors in the picture signals obtained by scanning an original picture. In terms of a color plane in which three basic colors are represented by three coordinate axes extending from an origin 120 degrees apart from one another so that each color may be represented by polar coordinates, the angle corresponding to the hue of the color while the radius corresponding to the color saturation of the color, one can identify the color as to which one of the three sectors defined by the three coordinate axes the color belongs to by comparing the ratios between the components of the three basic colors at each point of the picture as it is scanned. For example, if a certain color is composed of red, green and blue components and the red component is the minimum of the three components, then the color may be identified to the extent that it lies in the sector defined by the axes corresponding to green and blue colors. Such a process can be easily implemented using a strictly analog process. However, the output will assume only two values, yes or no, or, in another words, whether the colors are in the same sector of the color plane or not.

It is also known that, by adding another three coordinate axes corresponding to the three colors complementary to red, green and blue to the color plane and defining six sectors in the color plane, an improvement of the accuracy in the color identification over the above described method can be effected.

However, with either one of the above described conventional methods, the resolution in color isolation is not sufficient for distinguishing two colors having a small color tone difference therebetween. Therefore, they are not useful for most applications.

SUMMARY OF THE INVENTION

In view of the above described shortcomings of the conventional methods, one of the primary objects of this invention is to provide a color isolating method by which the portions of an original picture corresponding to an actual desired color are isolated simultaneously as the original picture is scanned.

According to this invention, such an object is accomplished by providing a color isolation method in which each scanned point is isolated when the color of the point agrees with an actual desired color in terms of quantized values of hue or hue and color saturation. This method can be conveniently implemented by utilizing a color plane, as mentioned before, which are however further divided up into suitable increments, each of which is associated with a certain range of hue or hue and color saturation of each scanned point of the original picture as well as of the actual desired color.

According to the method of this invention, a high resolution in color isolation can be obtained by using a relatively simple arrangement and the resolution can be improved merely by increasing the size of the increments smaller according to one's need. Furthermore, since an actual color is used for defining a reference color and can be directly seen by the operator, a highly subtle isolation of color can be effected yet involving relatively simple human operation.

Other novel features which are believed to be characteristic of the invention together with further objects and advatages thereof will be better understood from the following description considered in connection with the accompanied drawing in which a preferred embodiment of the invention is illustrated by way of example. It is to be understood, however, that the drawings are for the purpose of illustration and description only, and are not intended as a definition of the limits of the invention.

BRIEF DESCRIPTION OF THE DRAWINGS

FIG. 1 shows a two dimensional cartesian coordinate system on which three color coordinate axes are superimposed. Each of the three coordinate axes is extending from the origin of the cartesian coordinate system in a direction which is 120 degrees apart from another. The three coordinate axes are designated as B-axis, G-axis and R-axis, each of the axes corresponding to one of the colors of blue [B], green [G] and red [R]. And these three color axes define three basic color sectors which are designated as BG-plane, GR-plane and RB-plane according to the names of the color axes which define the boundaries of the respective sectors.

Figure 1:
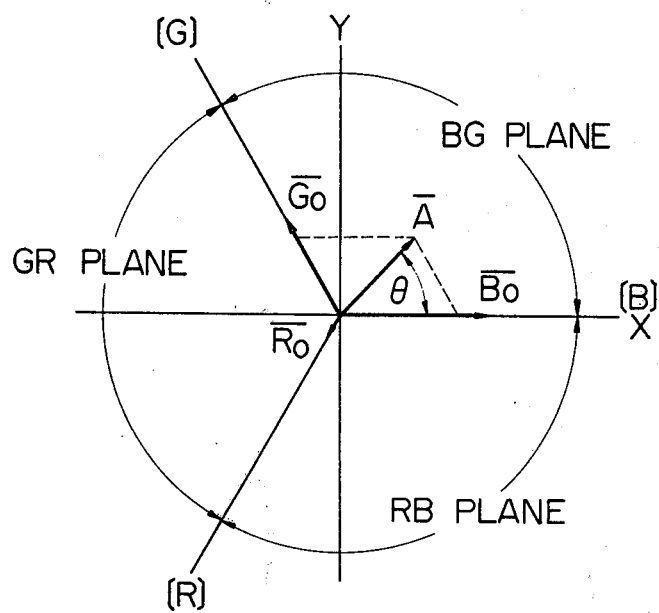
FIG. 1 shows a color plane consiting of a cartesian coordinate system with three color coordinate axes superimposed thereon.

Since color separation signals obtained by photoelectrically scanning an original color picture can be given in terms of the magnitude of the three basic colors, $B_0$, $G_0$ and $R_0$, they can be represented on the three color coordinate axes. And the color of the scanned point can now be represeted as a vector sum A composed of three vectors $\bar{B}_0$, $\bar{G}_0$ and $\bar{R}_0$ which have the magnitudes $B_0$, $G_0$ and $R_0$ and aligned to the direction of the respective coordinate axes, or $$\bar{A} = \bar{B}_0 + \bar{G}_0 + \bar{R}_0$$

Now, if the B-axis is aligned to the X-axis as shown in the drawing, the vector $\bar{A}$ can be represented in terms of two values, the magnitude of the vector A ($=|\bar{A}|$) and the angle a which the vector $\bar{A}$ forms with the B-axis.

Thus it can be seen from above description that the hue of a color can be known from the relative position of a vector which is representative of a certain color on the color plane, i.e. by the angle which it forms with the B-axis, $\theta$ in the case of the vector A. On the other hand, the color saturation of a color can be known from the magnitude of the vector which is representative of the color on the color plane, A in the case of the vector A.

Now, according to this invention, the above described color plane is divided into a number of incremental areas and each of the incremental areas is associated with certain ranges of $\theta$ and A. Therefore, any color can be represented by a particular incremental area to which the tip of the vector representative of the color belongs and a desired resolution in color, or a desired accuracy in the values of $\theta$ and A can be obtained simply by increasing the number of divisions or by reducing the size of each incremental area.

Figure 2:
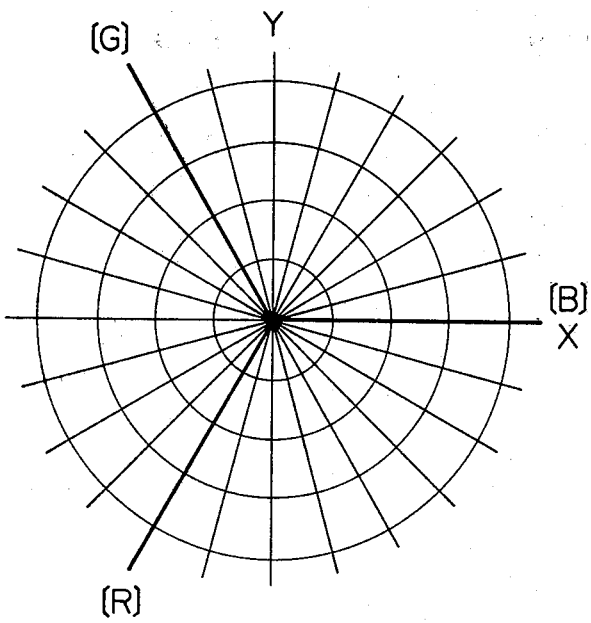
FIG. 2 shows an example of the division of the coordinate system of FIG. 1 into incremental areas.

In FIG. 2, the color plane of FIG. 1 is divided into 24 incremental areas by 24 radial lines extending from the origin, each of the radial lines spaced apart from one another by an equal angle of 15 degrees. And, each of the incremental areas thus divided is further divided into four incremental areas by four concentric circles with their centers located at the origin. Therefore, the whole color plane is divided into 96 incremental areas. In some applications where only the hue is important, the further division by the concentric circles may be omitted.

Now, in order to associate each color which is obtained as picture signals for blue, green and red derived by scanning an original picture, it is necessary to find the vector $\overline{A}$ which is representative of the specfic color.

Figure 3:
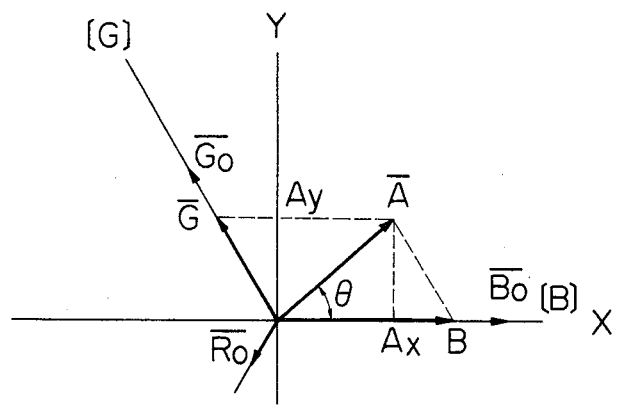
FIG. 3 is an expanded view of FIG. 1 for showing the principles of color isolation according to this invention.

When the vector $\overline{A}$ happens to be located in BG-plane for example, as shown in FIG. 3 or the magnitude of the vector $\overline{R_0}$ is found to be the minimum of the three color signals, then the vector $\overline{A}$ can be represented as a sum of two vectors B and G which are given by adding $\overline{B_0}$ and $\overline{G_0}$ components of $\overline{R_0}$ to the $\overline{B_0}$ and $\overline{G_0}$, or $$\overline{A} = \overline{B_0} + \overline{G_0} + \overline{R_0} = B_0 \overline{b} + G_0 \overline{g} + R_0 \overline{r}$$
$$= \overline{B} + \overline{G} = (B_0 + R_0) \overline{b} + (G_0 + R_0) \overline{g}$$

where b, g and r are unit vectors directed along the $\overline{B}$-, $\overline{G}$- and $\overline{R}$-axes, respectively.

Therefore, if the unit vectors directed along the X- and Y-axes are represented as $\overline{i}$ and $\overline{j}$, respectively, then the vector $\overline{A}$ can be expressed as $\overline{A} = A_x \overline{i} + A_y \overline{j}$ where $A_x$ and $A_y$ as given as:

$$A_x = B - \cos\frac{\pi}{3} G = B - \frac{1}{2} G$$

$$A_y = \cos\frac{\pi}{6} G = \frac{\sqrt{3}}{2} G$$

where $B = |\overline{B}|$ and $G = |\overline{G}|$.
Hence, $$\theta = \tan^{-1}\frac{A_y}{A_x} = \tan^{-1}\frac{\sqrt{3} \, G}{2B - G} \quad (1)$$

$$A = |\overline{A}| = \sqrt{A_x^2 + A_y^2} = \sqrt{B^2 - BG - G^2} \quad (2)$$

Similarly, when the vector $\overline{A}$ is found to be located in the GR-plane, $\overline{A}$ can be espressed as:

$$\overline{A} = \overline{G} + \overline{R} = (G_0 + B_0) \overline{b} + (R_0 + B_0) \overline{r} \text{ and}$$

$$\theta = \tan^{-1}\frac{\sqrt{3} \, (R - G)}{G + R} \quad (3)$$

$$A = \sqrt{G^2 - GR - R^2} \quad (4)$$

where $R = |\overline{R}|$.

And, when the vector A is found to be located in the RB-plane, A can be defined by:

$$\theta = \tan^{-1}\frac{\sqrt{3} \, R}{R - 2B} \quad (5)$$

$$A = \sqrt{R^2 - RB + B^2} \quad (6)$$

The equations (1) through (6) given above are generally not practical to compute in an analog computer. And, even with a digital computer, it is almost impossible to perform the computations in real time following the photoelectrical scanning of an original picture.

In view of such recognitions, this invention proposes to associate every possible combination of digitalized color separation picture signals $B_1$, $G_1$ and $R_1$ with one of the incremental areas, such as those shown in FIG. 2, to each of which a memory space with an appropriate address is assigned.

It becomes thus possible to compare each specific color of scanned points of the original color picture with a reference color, which is given in advance as an actual color, by comparing the incremental areas in the color plane in which the two colors are located or the memory space in which they are stored.

Specifically, the above described comparison can be conveniently made by comparing the angles and the magnitudes of the color vectors in the polar coordinate system. It is preferable if, first of all, their minimum color signals are compared since it will narrow down the location of the color vector to one of the three sectors of the color plane and determines which two of the equations (1) through (6) should be used.

Figure 4:
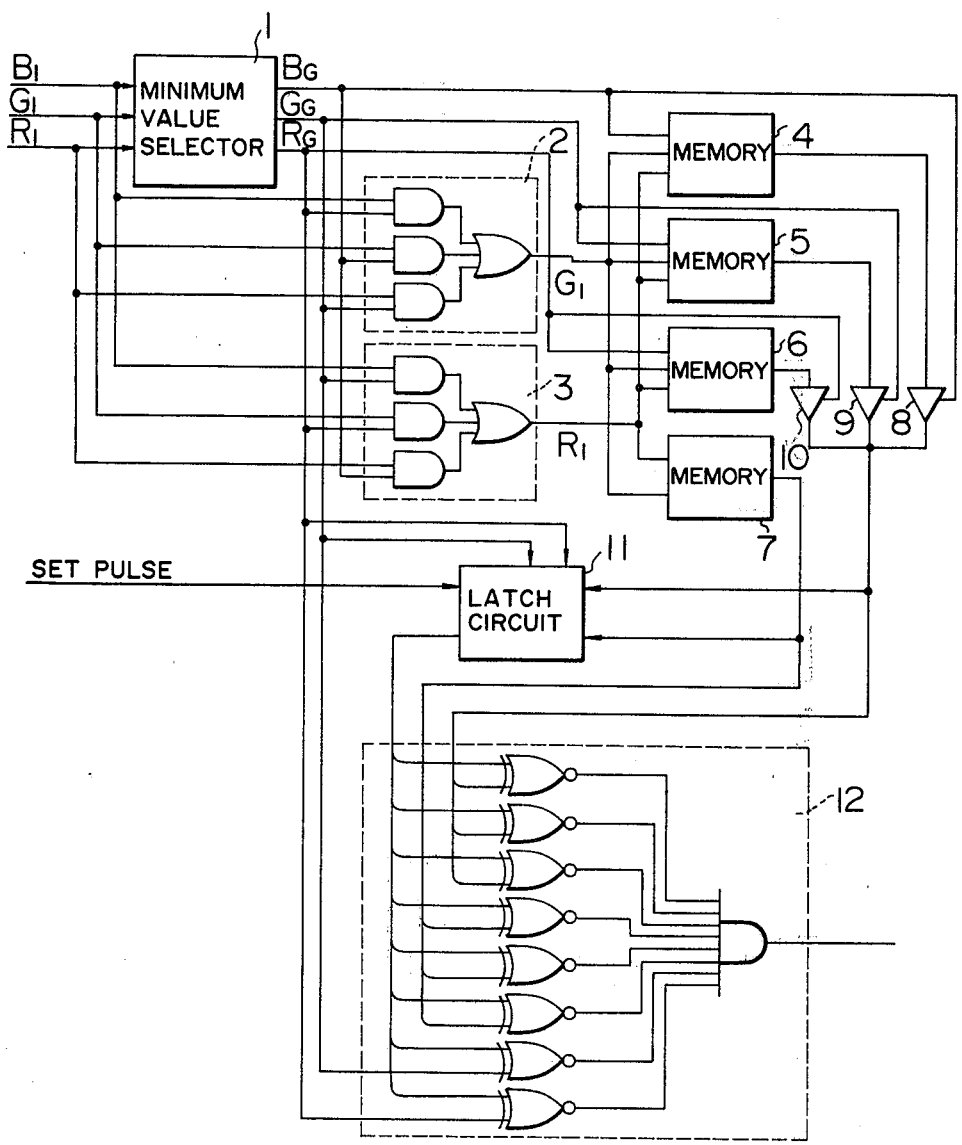
FIG. 4 shows an circuit, in a diagram, which is convenient for implementing the method of this invention.

FIG. 4 shows an example of circuit which is convenient for actually conducting the above described processes. Each of the color separation signals $B_1$, $G_1$ and $R_1$, which are obtained by photoelectrically scanning the original color picture, are, after being converted into digital signals, supplied to a minimum value selector 1.

Figure 5:
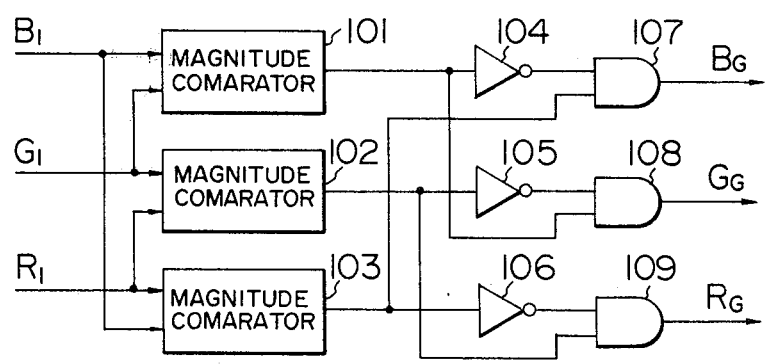
FIG. 5 shows an example of circuit which can be used as the minimum value selector 1 in FIG. 4.

The minimum value selector 1, which may comprise as shown in FIG. 5, magnitude comparators 101, 102 and 103, inverters 104, 105 and 106, and AND gates 107, 108 and 109, compares the magnitudes of $B_1$ and $G_1$, $G_1$ and $R_1$, and $R_1$ and $B_1$ at its magnitude comparators 101, 102 and 103, respectively. The magnitude comparator 101 produces a "H" signal when $B_1 \geq G_1$ and a "L" signal when $B_1 < G_1$. The magnitude comparator 102 produces a "H" signal when $G_1 \geq R_1$ and a "L" signal when $G_1 < R_1$. And the magnitude comparator 103 produces a "H" signal when $R_1 \geq B_1$ and a "L" signal when $R_1 < B_1$. Therefore, when a set of color separation picture signals are supplied to the minimum value selector 1, the signals are compared with one another and the results of comparisons are processed by a logic circuit consisting of inverters 104, 105 and 106 and AND gates 107, 108 and 109. And the output of the minimum value selector 1 consists of three gate signals, $B_G$, $G_G$ and $R_G$, with one of the gate signals corresponding to the minimum signals of $B_1$, $G_1$ and $R_1$ being in a "H" state while the remaining two gate signals being in a "L" state.

For example, if $B_1$ is the minimum of the three picture signals and $G_1 < R_1$, then the outputs of the magnitude comparators 101, 102 and 103 are "L", "L" and "H", respectively, and the gate signal $B_G$ will be in a "H" state while $G_G$ and $R_G$ will be in a "L" state, meaning that the picture signal $B_1$ corresponding to blue color is the minimum of the three color separation picture signals, $B_1$, $G_1$ and $R_1$.

The color separation picture signals $B_1$, $G_1$ and $R_1$ are supplied to signal selecting circuits 2 and 3 also. The gate signals $B_G$, $G_G$ and $R_G$ are also supplied to these signal selecting circuits 2 and 3 and, according to the content of the gate signals which contain one "H" signal corresponding to the minimum of the three color separation picture signals and two "L" signals, two larger values of the picture signals $B_1$, $G_1$ and $R_1$ are produced from the outputs of the respective signal selecting circuits 2 and 3.

For example, if the gate signal $B_G$ is in a "H" state while the remaining two gate signals $G_G$ and $R_G$ are in a "L" state, then the output from the signal selecting circuit 2 is $G_1$ while the output from the signal selecting circuit 3 is $R_1$.

The outputs of the signal selecting circuits 2 and 3 are in turn supplied to each of memory devices 4, 5, 6 and 7, in parallel, as address signals. The gate signals $B_G$, $G_G$ and $R_G$ are also supplied to each of these memories, also in parallel, as chip selecting signals for selecting a particular memory which is to be used. And the color separation picture signals produced from the signal selecting circuits 2 and 3 are then associated with one of the incremental areas in the color plane which is assigned to one of the addresses of the memories 4, 5 and 6 with respect to the angle of the vector $\theta$ as a three-digit binary code. And each of the color separation signals is also associated with one of the divisions by the concentric circles on the color plane each assigned to an address in the memory 7 as a three-digit binary code.

And, the information stored in the memories 4, 5, 6 and 7 is read out and, via one of the bus buffers 8, 9 and 10 which are selected by the gate signals $B_G$, $G_G$ and $R_G$, sent to an agreement circuit 12 which comprises eight exclusive NOR circuits and one AND gate.

Meanwhile, in a latch circuit 11, data on $\theta$ and A obtained by photoelectrically scanning a reference color, which is desired to be isolated when scanning the original color picture, are latched in advance. Two of the gate signals $G_G$ and $R_G$ are also supplied to the latch circuit 11 for finding which of the BG-plane, GR-plane and RB-plane the color vector is located in. Namely, the vector is in the GB-plane when the gate signals $G_G$ and $R_G$ are both in a "L" state, in the RB-plane when the gate signals $G_G$ and $R_G$ are "H" and "L", respectively, and in the BG-plane when the gate signals $G_G$ and $R_G$ are "L" and "H", respectively. Thus, a complete set of information, the angle $\theta$, the magnitude A and the plane in which the vector lies, are latched in the latch circuit 11 and they are fed to the agreement circuit 12.

Therefore, the data latched in the latch circuit 11 as a reference color are compared with the data read out from the memories in the agreement circuit 12 which produces a "H" signal only when a complete agreement is found in its input. Since the data latched in the latch circuit 11 can be released and latched anew simply by controlling the set pulses it receive, color isolation of a desired number of colors can be accomplished in a sequential manner and simultaneously as scanning the original picture.

Although the above description dealt with the case where specific colors of an original picture were isolated by comparing the hue and the color saturation thereof it is also possible, according to this invention, to isolate colors comparing only the hue thereof and omitting the comparison with respect to the color saturation. In this case, the color plane is not required to be divided up by the concentric circles.

Furthermore, although, in the above described embodiment, the whole color plane was divided by 24 radial lines and four concentric circles, into 96 incremental areas in all, it is possible to make the division finer by increasing the number of the concentric circles and radial lines according to the desired accuracy.

Thus, according to the method of this invention, a plane coordinate system, such as a cartesian coordinate system is divided into a BG-, a GR- and a RB-plane by the B-, G- and R-axes and further into a plurality of incremental areas by radial lines and concentric circles having their centers at the origin of the coordinate system, and specific colors of the original color picture are isolated by comparing them with corresponding reference colors which may be give as an actual color sample or a set of numerical data with respect to their values in quantized hue or hue and color saturation.

The method of this invention has many practical advantages. Since the circuit required for implementing the method is relatively simple in structure and requires relatively small capacity of memory, it is possible to attain a desired accuracy without causing any difficulty in performing the method. And the reference color can be given as an actual color sample and, hence, there is little possibility of any errors to be caused.

Although the present invention has been described with respect to the specific embodiment thereof, it is obvious to a person skilled in the art that a number of modifications and variations are possible. For example, by incorporating a digital switch or the like, it is possible to give the reference color in terms of a set of digital data on a reference color. And the manner in which the color plane was divided does not necessarily has to be limited to that described in the above but there are infinitely many ways of dividing the color plane. For example, in addition to dividing the whole color plane into the basic three color sectors, it is also possible to divide it into six basic color sectors by introducing three additional color axes which may be associated with the complementary colors of the three basic colors described before. Thereby, a more simplified operation may become possible for an operating personnel since the description of the color will become more concrete to him.

What is claimed as new is:

1. A color isolation method for isolating colors of individual portions of a colored picture comprising:
    scanning said picture point by point to extract color components of each of said points;
    comparing each of said color components with a reference color to provide a set of comparison signals;
    converting said color components by use of said comparison signals to a set of vector signals wherein the number of vector signals is less than the number of said color components;

storing vectorial representations of combinations of said color components in a memory; and addressing said memory with said vector signals and said comparison signals to extract vectorial representations of the color of successive ones of said points of said picture.

2. A color isolation method according to claim 1 wherein, each of the colors is represented by one of incremental areas of a color plane which graphically represents a desired range of color and the portion of the original color picture having the color which corresponds to the reference color, in that these two colors are represented by the same incremental area of the color plane; and wherein:

the color plane is represented by a plane coordinate system having three axes which correspond to three different basic colors and which plane is divided into a plurality of sectors by radial lines, each sector corresponding to different hues.

3. A color isolation method according to claim 2, wherein the color plane is further divided up by concentric circles for defining different color saturations.

4. A color isolation method according to claim 2 or 3, wherein the original picture is photoelectrically scanned and wherein the comparing of the color of each scanned point with the reference color, corresponding to respective incremental areas, and is accomplished at the same time as the original color picture is scanned.

5. A color isolation method according to claim 4, wherein the color plane is divided into three basic color sectors and the comparison includes the identification of the basic color sectors to which the two colors belong.

6. A color isolation method according to claim 5, wherein the reference color is given by photoelectrically scanning an actual color.

7. A color isolation method according to claim 6, wherein the reference color is given as a set of data latched in a latching circuit which can be reset by a control signal.

8. A method according to claim 1, wherein said step of comparing is accomplished by a logic operation including the combining of comparisons between pairs of color components drawn from a group consisting of all of said color components, said logic arrangement including the determining of the color component having the smallest amplitude.

9. A method according to claim 8, wherein said step of storing the vectorial representations is accomplished in accordance with a plan consisting of three primary reference colors each of which is represented by a vector, each of said color components corresponding to one of said vectors.

10. A method according to claim 9, wherein the vectorial representations of said storing step are presented in terms of amplitude and angled with reference to a planar configuration of a color chart.

* * * * *